United States Patent
Lau et al.

(10) Patent No.: US 8,273,284 B2
(45) Date of Patent: Sep. 25, 2012

(54) POSITION ADJUSTING MEANS FOR HOT RUNNER NOZZLES, ADJUSTING METHOD AND USE THEREOF

(76) Inventors: Kwong Fat Lau, Guangdong Province (CN); Siu Ming Chan, Guangdong Province (CN); Qiang You, Guangdong Province (CN); Kim Kwong Henry Liu, Guangdong Province (CN); Zhijiang Xu, Guangdong Province (CN)

( * ) Notice: Subject to any disclaimer, the term of this patent is extended or adjusted under 35 U.S.C. 154(b) by 184 days.

(21) Appl. No.: 12/826,716

(22) Filed: Jun. 30, 2010

(65) Prior Publication Data
US 2011/0012277 A1   Jan. 20, 2011

(30) Foreign Application Priority Data
Jul. 16, 2009   (CN) .......................... 2009 1 0041198

(51) Int. Cl.
*B29C 45/27*   (2006.01)
(52) U.S. Cl. ...................... 264/328.8; 425/572; 425/573
(58) Field of Classification Search .................. 425/570, 425/572, 573; 264/39, 328.8
See application file for complete search history.

(56) References Cited

U.S. PATENT DOCUMENTS

| | | | | |
|---|---|---|---|---|
| 3,812,228 | A * | 5/1974 | Skoroszewski | 264/54 |
| 5,017,127 | A * | 5/1991 | Majerus et al. | 425/549 |
| 5,540,580 | A * | 7/1996 | Takada | 425/539 |
| 5,641,526 | A * | 6/1997 | Gellert | 425/549 |
| 6,135,751 | A * | 10/2000 | Gellert et al. | 425/130 |
| 6,561,790 | B2 * | 5/2003 | Blais et al. | 425/572 |
| 6,648,622 | B1 * | 11/2003 | Gellert et al. | 425/130 |
| 2006/0204611 | A1 * | 9/2006 | Serniuk et al. | 425/573 |
| 2007/0082082 | A1 * | 4/2007 | Feick et al. | 425/549 |
| 2009/0191302 | A1 * | 7/2009 | Jenko et al. | 425/549 |

FOREIGN PATENT DOCUMENTS
JP   2008-062521   *   3/2008

OTHER PUBLICATIONS
Electronic translation of Japan reference 2008-062521.*

* cited by examiner

*Primary Examiner* — Jill Heitbrink (57) ABSTRACT

The present invention relates to a position adjusting means for hot runner nozzles comprising a main inlet, a manifold, a rotational transitional piece and a nozzle; the rotating transitional member is disposed with an inlet and an outlet; the inlet and the outlet of the rotating transitional member each has a symmetry axis and the two symmetry axes are disposed in parallel with and spaced apart from each other for a particular distance; the inlet of the rotating transitional member and the outlet of the manifold are connected to each other in a rotatable and sealed manner; the outlet of the rotating transitional member and the inlet of the nozzle are connected to each other in a rotatable and sealed manner; the nozzle or a nozzle assembly formed by the nozzle and a nozzle extension member of the nozzle combining together is disposed with an inlet and an outlet; the inlet and the outlet of the nozzle or the nozzle assembly each has a symmetry axis and the two symmetry axes are disposed in parallel with and spaced apart from each other for a particular distance. With the symmetry axis of the inlet of the nozzle or the rotating transitional member as circle center, rotate either one of the rotating transitional member or the nozzle or rotate both the rotating transitional member and the nozzle to position the outlet of the nozzle at a desired position within a particular area, thereby attaining adjustment of the position of the hot runner nozzle. The present invention may be applied to hot runner systems of plastics injection molding.

13 Claims, 10 Drawing Sheets

POSITION ADJUSTING MEANS FOR HOT RUNNER NOZZLES, ADJUSTING METHOD AND USE THEREOF

BACKGROUND OF THE INVENTION

The present invention relates to a runner system for the processing of plastics or other materials and more particularly pertains to a position adjusting means for hot runner nozzle and the adjusting method and use thereof.

A hot runner system is an extension of the nozzle of an injection molding machine. As a part of the mold, the hot runner system serves to keep plastics in a molten state during the processing and molding of plastics, and to channel the molten plastics to different mold cavities. It may eliminate wastage of sprue materials, lower injection pressure, shorten injection cycle and enhance product quality.

Figure 1:
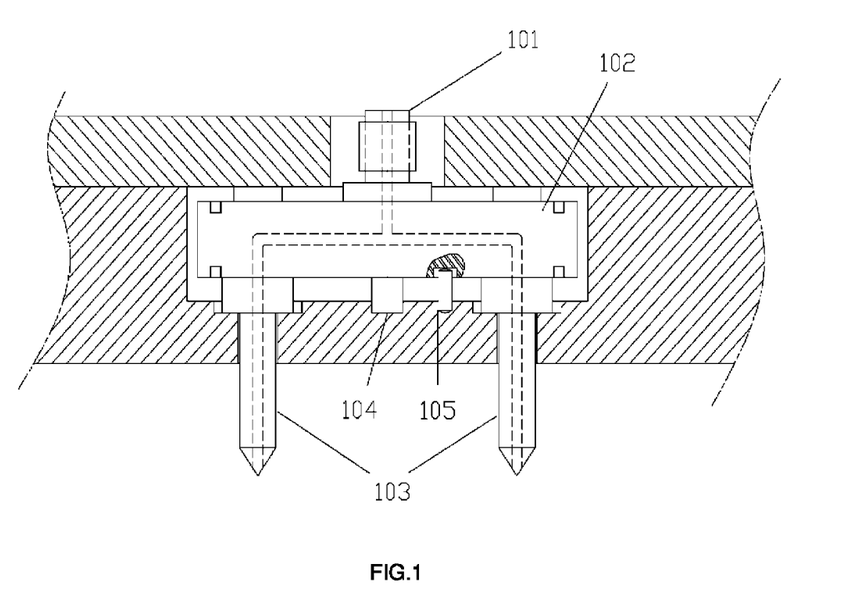
FIG. 1 illustrates an existing hot runner system.

FIG. 1 illustrates a conventional hot runner system which mainly comprises three parts, namely a main inlet 101, a manifold 102 and nozzles 103. The main inlet is connected with an injection opening of an injection molding machine. The main inlet is also connected with an inlet of the manifold. The manifold is disposed with runners therein. Each of the runners has an outlet which is connected with one of the nozzles. When the hot runner system is in operation, the sealing between the manifold outlets and nozzle inlets is normally achieved by heat expansion of the manifold components, and the clamping force of mold plates. The main inlet, the manifold and the nozzles are disposed with a heating component. The hot runner system is disposed inside the mold plate of a mold. The bottom central part of the manifold is disposed with a circular central positioning means 104 and a positioning pin 105 to fix the position of the manifold inside the mold plate. Depending on the requirements of different molds, it is possible to adjust the design of the manifold and the number of nozzles of different configurations, thereby catering for the needs of different molds. However, such conventional hot runner system has a fixed configuration design. The manifold is designed according to the positions of the nozzles. After the positions of the nozzles have been fixed, the corresponding outlets of the manifold would be processed and machined and could not be changed. After the utilization cycle of the mold has been completed, the hot runner system with fixed configuration could not be applied to other molds with different nozzle arrangements. On the other hand, to the clients who order manufacturers to manufacture such hot runner system with fixed configuration, no adjustment is possible after the positions of the nozzles have been fixed. If adjustment is needed at a later design stage, the mold must be designed according to the fixed positions of the nozzles of the hot runner system. It is impossible to optimize the design of the mold unless the manifold is manufactured again, which results in wastage.

In view of the above, the present hot runner systems with fixed configuration have the problems of poor applicability, unreasonable configuration and inconvenience in use, and the problems are yet to be overcome.

BRIEF SUMMARY OF THE INVENTION

In view of the aforesaid disadvantages now present in the prior art, the present invention provides a position adjusting means for hot runner nozzles which is flexible to adjust, reasonable in configuration, convenient to use, widely applicable to mold plates with different nozzle position layouts, and environmental friendly.

It is another object of the present invention to provide an adjusting method to adjust positions of hot runner nozzles utilizing the aforesaid position adjusting means for hot runner nozzles.

It is yet another object of the present invention to provide the use of the aforesaid position adjusting means for hot runner nozzles and the adjusting method thereof.

The objects of the present invention is achieved by the following technical proposals:

A position adjusting means for hot runner nozzles disposed in a mold plate of a mold, comprising a main inlet, a manifold and a nozzle; the manifold and the nozzle are each disposed with an inlet and an outlet, characterized in that it further comprises a rotating transitional member disposed with an inlet and an outlet; the inlet and the outlet of the rotating transitional member each has a symmetry axis and the two symmetry axes are disposed in parallel with and spaced apart from each other for a particular distance (X); the inlet of the rotating transitional member and the outlet of the manifold are connected to each other in a rotatable and sealed manner; the outlet of the rotating transitional member and the inlet of the nozzle are connected to each other in a rotatable and sealed manner; the nozzle or a nozzle assembly formed by the nozzle and a nozzle extension member of the nozzle combining together is disposed with an inlet and an outlet; the inlet and the outlet of the nozzle or the nozzle assembly each has a symmetry axis and the two symmetry axes are disposed in parallel with and spaced apart from each other for a particular distance (Y).

There may be one or more than one rotating transitional members. If there are more than one rotating transitional members, the configurations thereof are as follows: each of the rotating transitional member is disposed with an inlet and an outlet; the inlet and the outlet of each of the rotating transitional member each has a symmetry axis and the two symmetry axes are disposed in parallel with and spaced apart from each other for a particular distance; distances between adjacent rotating transitional members may be the same or different; each of the rotating transitional members is connected in sequence so that the inlet of the next in sequence rotating transitional member is connected with the outlet of the previous in sequence rotating transitional member in a rotatable and sealed manner; the inlet of the top most rotating transitional member is connected with the outlet of the manifold in a rotatable and sealed manner, and the outlet of the bottom most rotating transitional member is connected with the inlet of the nozzle in a rotatable and sealed manner; the nozzle extension member may also be a rotating transitional member.

Connection of two connecting sides in a rotatable and sealed manner is accomplished by disposing a recess and a protrusion at the two connecting sides respectively and engaging the recess and the protrusion.

Alternatively, connection of two connecting sides in a rotatable and sealed manner is accomplished by disposing a recess at a planar surface of each of the two connecting sides and a circular positioning ring in between the two connecting sides, and engaging the recesses and the circular positioning ring respectively to sealingly connect the two connecting sides with each other.

Alternatively, connection of two connecting sides in a rotatable and sealed manner is accomplished by disposing a recess at one of the connecting sides and receiving the other connecting side in the recess.

Connection of two connecting sides in a rotatable and sealed manner may allow any degree of rotation along the entire circumference; alternatively, a limiting means is disposed to allow limited degree of rotation in relation to each other.

The rotating transitional member or the nozzle has a cross section in shape of circle, ellipse, square, triangle, polygon or other shapes, with circle being the preferred shape.

The connecting sides which are connected to each other in a rotatable and sealed manner may be disposed in parallel to the mold plate of the injection molding machine; alternatively, they may be disposed at a particular degree in relation to the mold plate. This mainly depends on the manufacturing requirements in practice.

The connecting sides which are connected to each other in a rotatable and sealed manner are surfaces having relatively high degree of finish (a level of finish of 0.8 or below) to guarantee a high standard of sealing.

The runners in the rotating transitional member and the nozzle between respective inlets and outlets may have different arrangements provided that the symmetry axes of the inlet and the outlet are disposed in parallel with and spaced apart from each other for a particular distance. The runners may be in form of oblique runners which directly connect with respective inlets and outlets, or in step shape formed by vertical portions and horizontal portions joining together, or in arc shape, wave shape or vortex shape, depending on actual needs. The most preferred form is oblique runners which directly connect with respective inlets and outlets as it is the most convenient to process and has the shortest runner length.

The inlets and the outlets of the runners inside the rotating transitional member and the nozzle may be of the same size or of different configurations, for example, the inlet may have a larger diameter than the outlet.

There may be one or more than one runners connecting respective inlets and outlets inside the rotating transitional member and the nozzle.

The distance (X) between the symmetry axes of the inlet and the outlet of the rotating transitional member may be larger, the same or smaller than the distance (Y) between the symmetry axes of the inlet and the outlet of the nozzle or the nozzle assembly formed by the nozzle and the nozzle extension member combining together.

In special circumstances, the distance (X) between the symmetry axes of the inlet and the outlet of the rotating transitional member or the distance (Y) between the symmetry axes of the inlet and the outlet of the nozzle is 0.

To guarantee heating temperature, heating components may be installed in the main inlet, the manifold and the nozzle.

An adjusting method to adjust positions of hot runner nozzles utilizing the aforesaid position adjusting means for hot runner nozzles which comprises the following steps: with the symmetry axis of the inlet of the nozzle or the rotating transitional member as circle center, rotate either one of the rotating transitional member or the nozzle or rotate both the rotating transitional member and the nozzle to position the outlet of the nozzle at a desired position within a particular area, thereby attaining adjustment of the position of the hot runner nozzle. After all the nozzles have been defined with new positions, the hot runner system can be applied to another plate designed for this new nozzle position layout.

If there are more than one rotating transitional members, rotate either one of the nozzle or one or more of the rotating transitional members, or rotate both the nozzle and one or more of the rotating transitional members to position the outlet of the nozzle at a desired position within a particular area.

The position adjusting means for hot runner nozzles and the adjusting method thereof may be applied to hot runner systems of plastics injection molding, or other runner systems for channeling processing materials, such as cold runner systems for processing silicon.

Figure 2:
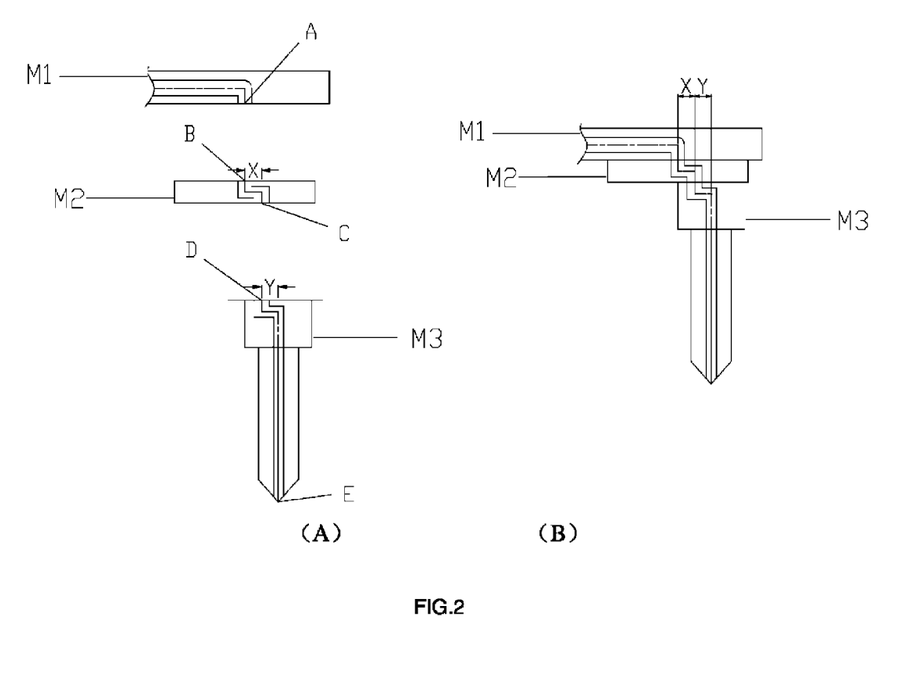
FIG. 2 illustrates the present position adjusting means for hot runner nozzles, with (A) being an exploded view and (B) being an assembled view.
Figure 3:
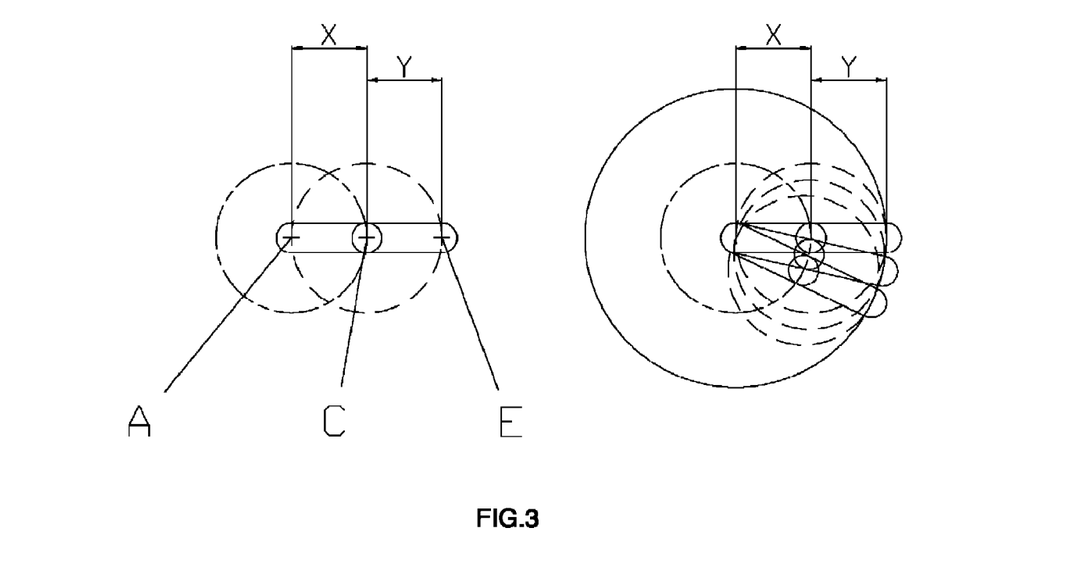
FIG. 3 illustrates the mechanism of the position adjusting means for hot runner nozzles as shown in FIG. 2.

The operating principle of the present invention is as follows: The object of the present position adjusting means for hot runner nozzles is to allow the position of the nozzle to be adjusted within a particular area, so that the same hot runner system can be applied to mold plates with different nozzle position layouts. As illustrated in FIG. 2, the outlet of the manifold M1 is point A; the inlet of the rotating transitional member M2 is point B and the outlet thereof is point C. The distance between point B and point C is X. The inlet of the nozzle M3 is point D and the outlet thereof is point E. The distance between point D and point E is Y. If point A and point B are joined together to allow the rotating transitional member M2 to rotate freely with point A as center, point C may be positioned at any point along the circumference with point A as center and X as radius. Similarly, if point C and point D are joined together to allow the nozzle M3 to rotate freely with point D as center, point E may be positioned at any point along the circumference with point D as center and Y as radius. Combining the above two motions (which is equivalent to connecting the manifold M1, the rotating transitional member M2 and the nozzle M3 sequentially), as illustrated in FIG. 3, the runner combination formed by the portion between points A, C and the portion between points C, E which are freely rotatable at points A and C respectively may allow point E to be positioned at any single point within the projected area of the circle with point A as center and (X+Y) as radius. Accordingly, if the rotating transitional member M2 and the nozzle M3 are rotated and adjusted simultaneously, the outlet (E) of the nozzle M3 may be positioned at a desired point within the circle with (X+Y) as radius. Therefore, it is possible to position the nozzle at any single point within the projected area of the circle with each outlet of the manifold as center and (X+Y) as radius, thereby allowing the position of the nozzle to be adjusted freely.

The present invention has the following advantages and effects in comparison to the prior art:

(1) Reasonable configuration: The present position adjusting means for hot runner nozzles introduces a rotating transitional member on the basis of existing hot runner systems, and also improves the configurations of the runners of the nozzles. In combination of the improvements in the two aspects, the position of the nozzle may be freely adjusted within a particular area. In comparison to the existing fixed nozzle configuration, the present invention has a more reasonable configuration and better fulfills the manufacturing needs in practice.

(2) Convenient to use: As the present invention achieves nozzle position adjustment by simply rotating the rotating transitional member and the nozzle without the need of any special tools or applying any stronger force, ordinary operating staff may easily use the present invention. The present invention is therefore simple to operate and very convenient to use.

(3) Widely applicable: In comparison to existing hot runner systems which are only applicable to one single mold design, the present position adjusting means for hot runner nozzles allows one single hot runner system to be applicable to multiple mold layouts. The application to different molds is attained by simply adjusting the position of the nozzle, and directly applying the hot runner system to mold plates for different nozzle position layouts. It is therefore high in adaptability with a wider application scope, resulting in significant savings in production costs.

(4) Environmental friendly: As the present position adjusting means for hot runner nozzles allows the hot runner system to be used repeatedly, it overcomes the deficiencies of the needs to manufacture different hot runner systems for different molds. It could therefore effectively avoid wastage of resources. It has a good energy saving effect, which is very good for environmental conservation.

DETAILED DESCRIPTION OF THE INVENTION

The present invention is further described in detail with the following embodiments and the accompanying drawings, but the present invention is not limited by the following embodiments.

Embodiment 1

Figure 4:
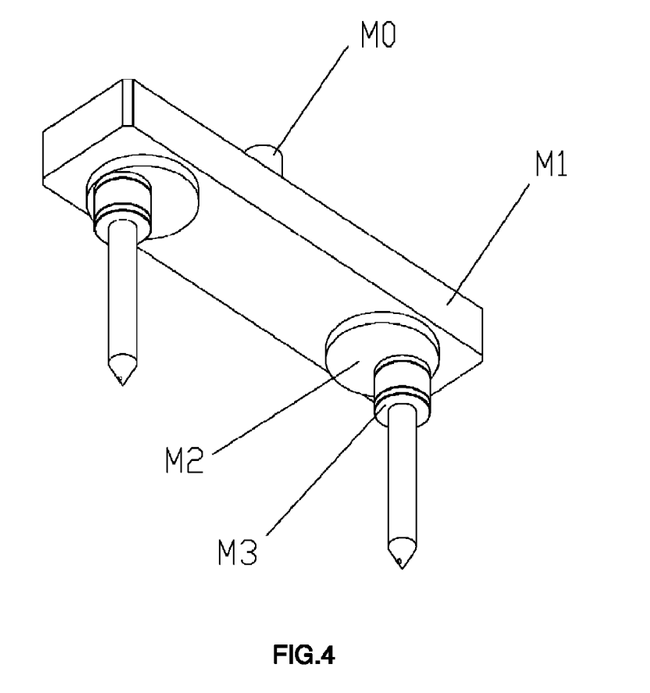
FIG. 4 is a perspective view of one of the embodiments of the present invention.
Figure 5:
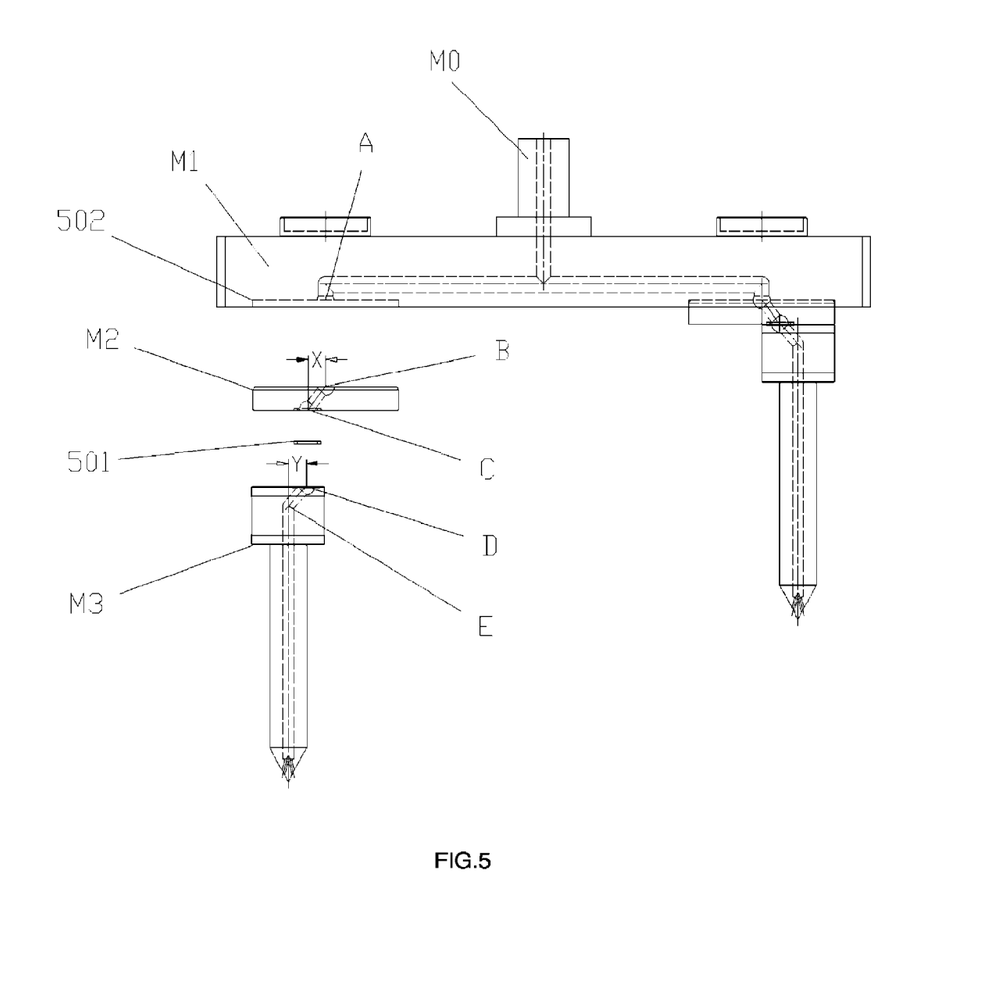
FIG. 5 is an exploded view of the embodiment as shown in FIG. 4.
Figure 6:
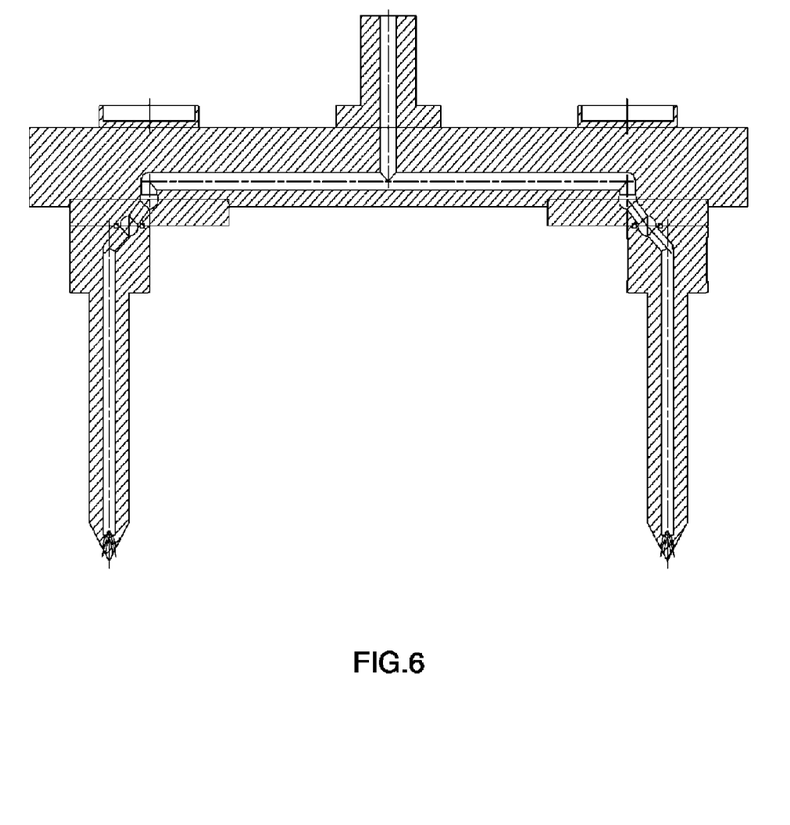
FIG. 6 is a cross sectional view of the embodiment as shown in FIG. 4.

FIGS. 4-6 illustrate the structure of the present invention. As illustrated in FIG. 4, the present position adjusting means for hot runner nozzles comprises a main inlet M0, a manifold M1, a rotating transitional member M2 and a nozzle M3. The manifold M1, the rotating transitional member M2 and the nozzle M3 are each disposed with an inlet and an outlet. The main inlet M0 is connected with an injection outlet of an injection molding machine. The main inlet M0 is also connected with the inlet of the manifold M1. The manifold M1 is disposed with runners therein. As illustrated in FIGS. 5 and 6, the rotating transitional member M2 is disposed with an inlet B and an outlet C. The inlet B and the outlet C each has a symmetry axis and the two symmetry axes are disposed in parallel with and spaced apart from each other for a particular distance (X), as illustrated in FIG. 5. The inlet B of the rotating transitional member M2 and the outlet A of the manifold M1 are connected to each other in a rotatable and sealed manner. The outlet C of the rotating transitional member M2 and the inlet D of the nozzle M3 are connected to each other in a rotatable and sealed manner. The inlet D and the outlet E of the nozzle M3 each has a symmetry axis and the two symmetry axes are disposed in parallel with and spaced apart from each other for a particular distance (Y).

Connection of the inlet B of the rotating transitional member M2 and the outlet A of the manifold M1 in a rotatable and sealed manner is accomplished as follows: The outlet A of the manifold M1 has a connecting side which is disposed with a recess. The rotating transitional member M2 has a top end which is received in the recess and cooperates with the recess to rotatingly connect therewith. The inlet B of the rotating transitional member M2 and the outlet A of the manifold M1 are connected to each other in a sealed manner.

Connection of the outlet C of the rotating transitional member M2 and the inlet D of the nozzle M3 in a rotatable and sealed manner is accomplished as follows: Both the outlet C and the inlet D have a planar connecting side which is disposed with a recess 502. A circular positioning ring 501 is disposed between the two connecting sides. The two connecting sides are connected to each other in a rotatable and sealed manner by engaging the recesses 502 and the circular positioning ring 501 respectively; at the same time, the outlet C of the rotating transitional member M2 and the inlet D of the nozzle M3 are sealingly connected with each other.

The connecting sides which are connected to each other in a rotatable and sealed manner may be parallel to the mold plate of the injection molding machine. The two connecting sides are surfaces having relatively high degree of finish (a level of finish of 0.8 or below) to guarantee a high standard of sealing. Connection of two connecting sides in a rotatable and sealed manner may allow any degree of rotation along the entire circumference. The rotating transitional member and the nozzle has a cross section in shape of circle. The runner in the rotating transitional member M2 is in form of an oblique runner which directly connects with the inlet and the outlet. The runner inside the nozzle M3 has two portions: namely a vertical portion and an oblique portion. The vertical portion and the oblique portion are in communication with each other. The outlet at one end of the vertical portion serves as the nozzle outlet.

To guarantee heating temperature, heating components may be installed in the main inlet M0, the manifold M1 and the nozzle M3.

The adjusting method to adjust positions of hot runner nozzles utilizing the aforesaid position adjusting means for hot runner nozzles comprises the following steps: with the symmetry axis of the inlet of the nozzle M3 or the rotating transitional member M2 as circle center, rotate either one of the rotating transitional member M2 or the nozzle M3 or rotate both the rotating transitional member M2 and the nozzle M3 to position the outlet of the nozzle M3 at a desired point within the circle with (X+Y) as radius. Therefore, it is possible to position the nozzle at any single point within the projected area of the circle with the outlet A of the manifold M1 as center and (X+Y) as radius, thereby allowing the position of the nozzle to be adjusted freely.

Embodiment 2

Figure 7:
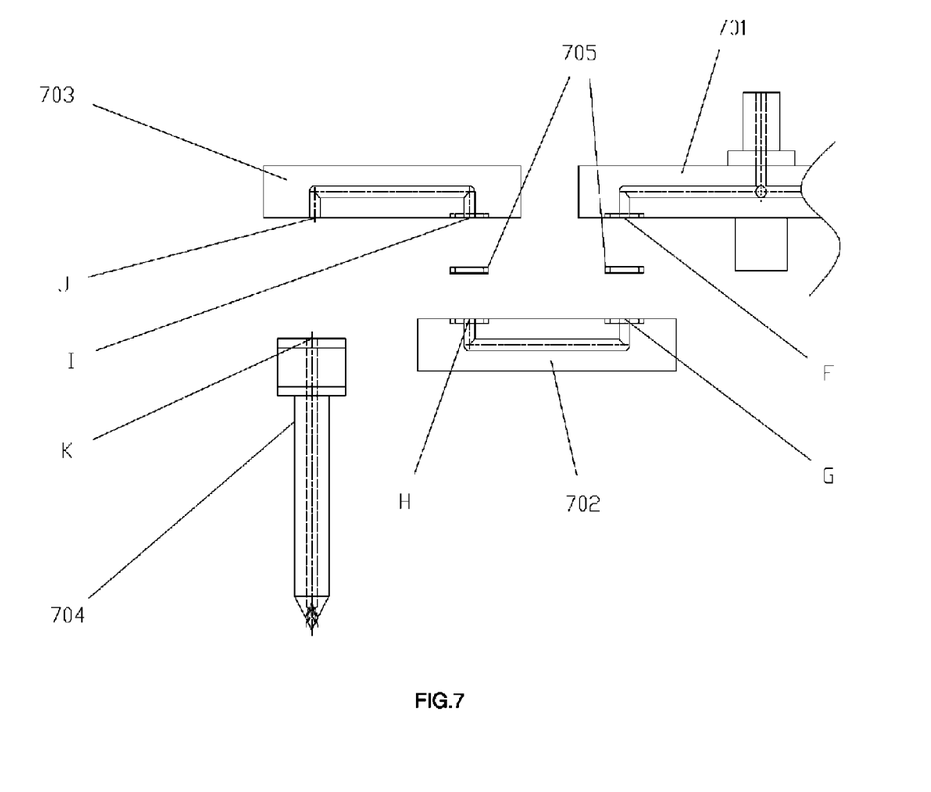
FIG. 7 is an exploded view of another embodiment of the present invention.
Figure 8:
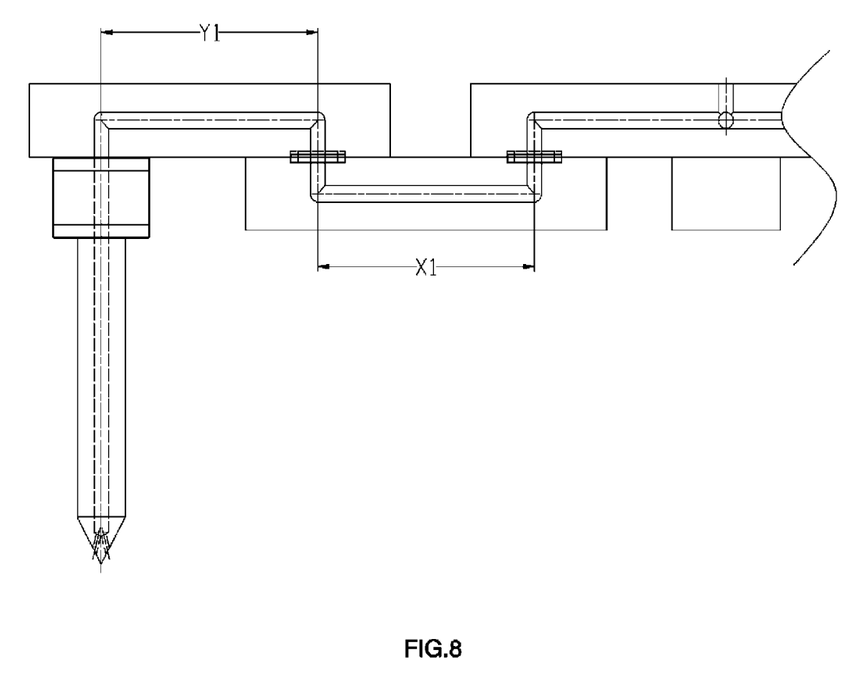
FIG. 8 illustrates the structure of the embodiment as shown in FIG. 7.

FIGS. 7-8 illustrate another structure of the present invention. As illustrated in FIG. 7, the present position adjusting means for hot runner nozzles comprises a manifold 701, a first rotating transitional member 702, a second rotating transitional member 703 and a nozzle 704. Each of the manifold 701, the first rotating transitional member 702, the second rotating transitional member 703 and the nozzle 704 is disposed with runners, an inlet and an outlet. The manifold 701 has a lower side which is disposed with an outlet with a center F. The outlet is disposed with a circular recess for receiving a circular positioning ring 705. The first rotating transitional member 702 has an upper side with two ends which is disposed with an inlet G and an outlet H respectively. The inlet G and the outlet H are disposed with a circular recess for receiving the circular positioning ring 705. As illustrated in FIG. 8, the distance between the inlet G and the outlet H is X1. The second rotating transitional member 703 has a lower side with two ends which is disposed with an inlet I and an outlet J respectively. The inlet I is disposed with a circular recess for receiving the circular positioning ring 705. The distance between the inlet I and the outlet J is Y1. The manifold 701 and the first rotating transitional member 702 are connected to each other in a rotatable and sealed manner via the circular positioning ring 705. The first rotating transitional member 702 and the second rotating transitional member 703 are also connected to each other in a rotatable and sealed manner via the circular positioning ring 705. The second rotating transitional member 703 is essentially an extension member of the nozzle. The nozzle 704 and the second rotating transitional member 703 combine together to form a nozzle assembly. The distance between the symmetry axes of the inlet I and the outlet J of the nozzle assembly is also Y1.

If X1 is set to be equal to Y1, according to the principle of the present invention, while keeping the respective inlets and outlets to be connected with each other, rotate the first rotating transitional member 702 and the second rotating transitional member 703 enables the nozzle to be located at any single point in the projected area of the circle with F as center and (X1+Y1) as radius. As the manifold 701 and the second rotating transitional member 703 are disposed at the same level, there exists certain interference against the scope of rotation and thereby limiting the positioning of the outlet J in a portion of the aforementioned projected area of the circle. However, in the present embodiment, X1 and Y1 may be set to larger value to allow larger space for positioning the nozzle 704.

Embodiment 3

Figure 9:
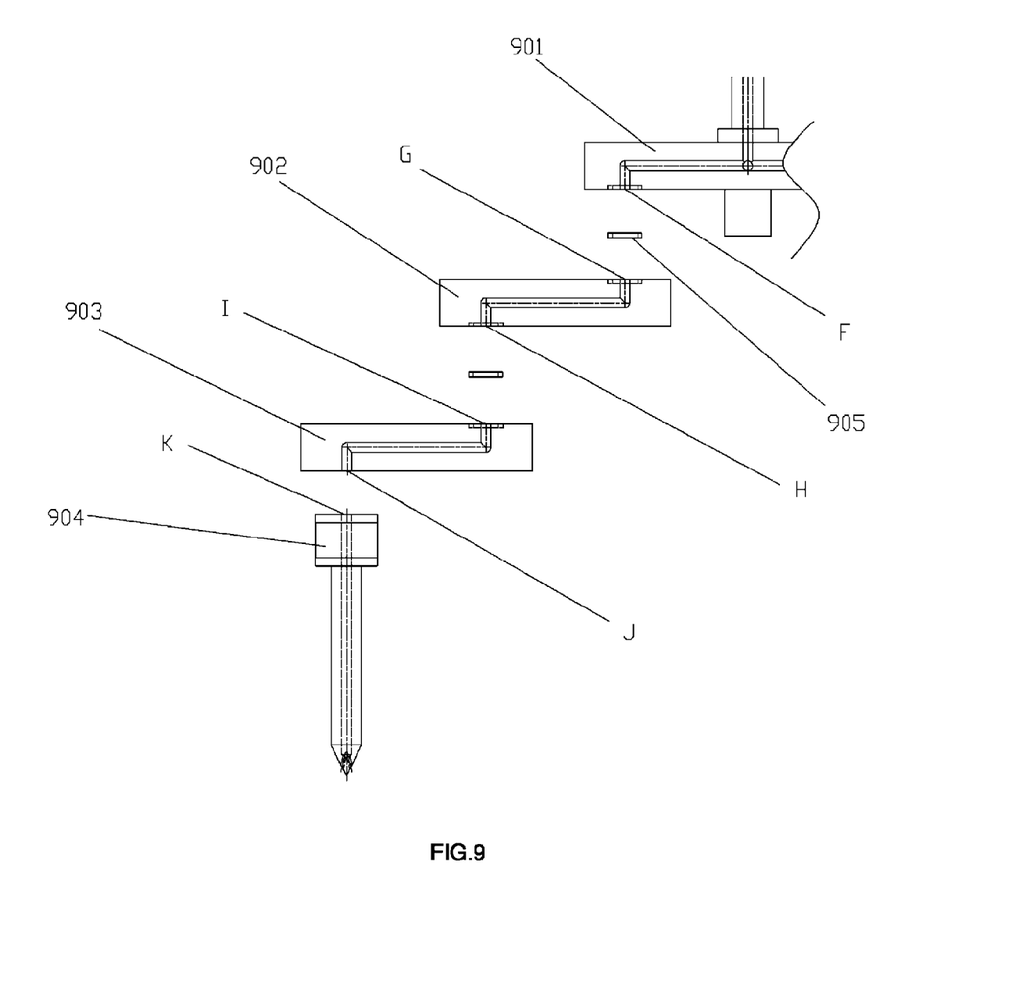
FIG. 9 is an exploded view of the third embodiment of the present invention.
Figure 10:
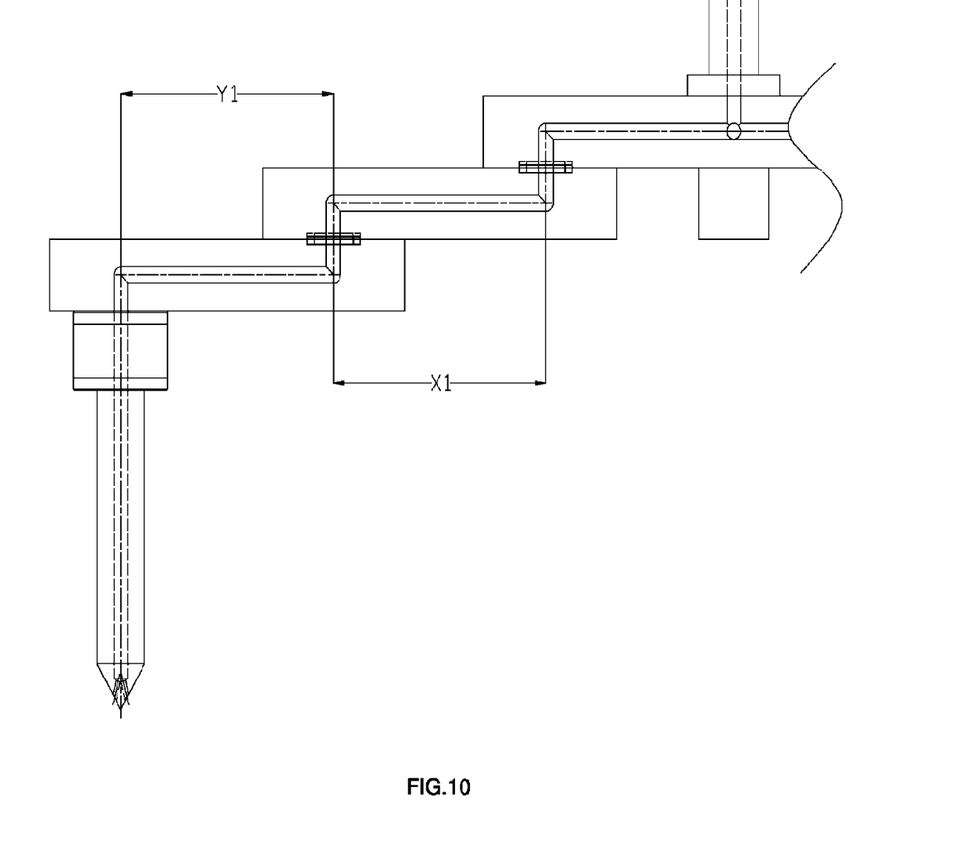
FIG. 10 illustrates the structure of the embodiment as shown in FIG. 9.

The present embodiment has similar structure as Embodiment 2 with the following exceptions (as illustrated in FIGS. 9-10):

As illustrated in FIG. 9, the first rotating transitional member 902 has an upper side which is disposed with an inlet G at an end and a lower side which is disposed with an outlet H at another end. The inlet G and the outlet H are each disposed with a circular recess for receiving a circular positioning ring 905. The distance between the inlet G and the outlet H is X1 (as shown in FIG. 10).

The second rotating transitional member 903 has an upper side which is disposed with an inlet I at an end and a lower side which is disposed with an outlet J at another end. The inlet I is disposed with a circular recess for receiving a circular positioning ring 905. The distance between the inlet I and the outlet J is Y1.

The manifold 901 and the first rotating transitional member 902 are connected to each other in a rotatable and sealed manner via the circular positioning ring 905. The first rotating transitional member 902 and the second rotating transitional member 903 are also connected to each other in a rotatable and sealed manner via the circular positioning ring 905. The second rotating transitional member 903 is essentially an extension member of the nozzle. The nozzle 904 and the second rotating transitional member 903 combine together to form a nozzle assembly. The distance between the symmetry axes of the inlet I and the outlet J of the nozzle assembly is also Y1.

As the manifold 901 and the second rotating transitional member 903 are not disposed at the same level, there is no interference against the scope of rotation. In comparison to Embodiment 2, the nozzle is susceptible to a larger positioning area, but the overall thickness of the component is larger.

Embodiment 4

Figure 11:
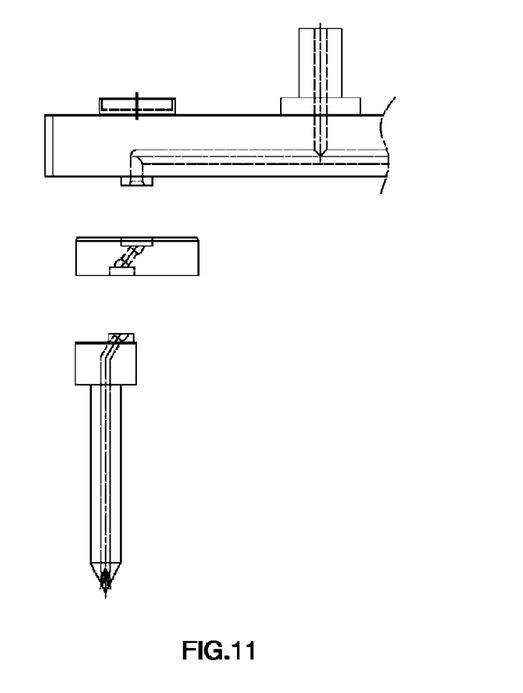
FIG. 11 is an exploded view of the fourth embodiment of the present invention.

The present embodiment (as illustrated in FIG. 11) has similar structure as Embodiment 1 with the following exceptions: The inlet of the rotating transitional member and the outlet of the manifold, as well as the outlet of the rotating transitional member and the inlet of the nozzle, are connected to each other in a rotatable and sealed manner as follows: The connecting sides are disposed with recesses and protrusions respectively. Through the engagement of the recesses and the protrusions, it is possible to achieve connection of two connecting sides in a rotatable and sealed manner.

Embodiment 5

Figure 12:
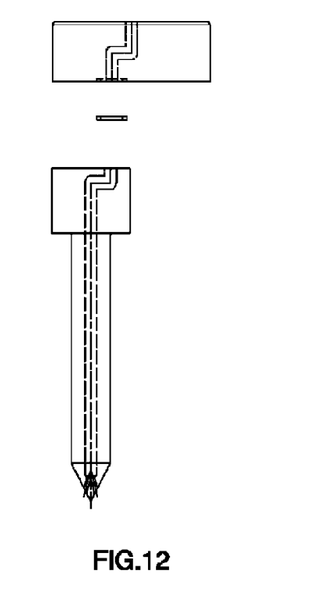
FIG. 12 illustrates the fifth embodiment of the present invention.

The present embodiment (as illustrated in FIG. 12) has similar structure as Embodiment 1 with the following exceptions: the runners in the rotating transitional member and the nozzle are in step shape formed by vertical portions and horizontal portions joining together.

Embodiment 6

The present embodiment applies the position adjusting means for hot runner nozzles in Embodiment 1 to other runner systems for channeling processing materials, such as cold runner systems for processing silicon.

The above embodiments are preferred embodiments of the present invention. The present invention is capable of other embodiments and is not limited by the above embodiment. Any other variation, decoration, substitution, combination or simplification, whether in substance or in principle, not deviated from the spirit of the present invention, is replacement or substitution of equivalent effect and falls within the scope of protection of the present invention.

What is claimed is:

1. A position adjusting means for hot runner nozzles disposed in a mold plate of a mold, comprising a main inlet, a manifold and a nozzle; the manifold and the nozzle are each disposed with an inlet and an outlet, characterized in that it further comprises a rotating transitional member disposed with an inlet and an outlet; the inlet and the outlet of the rotating transitional member each has a symmetry axis and the two symmetry axes are disposed in parallel with and spaced apart from each other for a particular distance; the inlet of the rotating transitional member and the outlet of the manifold are connected to each other in a rotatable and sealed manner; the outlet of the rotating transitional member and the inlet of the nozzle are connected to each other in a rotatable and sealed manner; a nozzle assembly formed by combining the nozzle and a nozzle extension member is disposed with an inlet and an outlet; each of the inlet and the outlet of the nozzle has a symmetry axis and the two symmetry axes are disposed in parallel with and spaced apart from each other for a particular distance; each of the inlet and the outlet of the nozzle assembly has a symmetry axis and the two symmetry axes are disposed in parallel with and spaced apart from each other for a particular distance; further, the position adjusting means for hot runner nozzles comprises more than one rotating transitional members, the configurations thereof are as follows: each of the rotating transitional member is disposed with an inlet and an outlet; the inlet and the outlet of each of the rotating transitional member each has a symmetry axis and the two symmetry axes are disposed in parallel with and spaced apart from each other for a particular distance; distances between adjacent rotating transitional members may be the same or different; each of the rotating transitional members is connected in sequence so that the inlet of the next in sequence rotating transitional member is connected with the outlet of the previous in sequence rotating transitional member in a rotatable and sealed manner; the inlet of the top most rotating transitional member is connected with the outlet of the manifold in a rotatable and sealed manner and the outlet of the bottom most rotating transitional member is connected with the inlet of the nozzle in a rotatable and sealed manner.

2. The position adjusting means for hot runner nozzles as in claim 1, wherein connection of two connecting sides in a rotatable and sealed manner is accomplished by disposing a recess and a protrusion at the two connecting sides respectively and engaging the recess and the protrusion.

3. The position adjusting means for hot runner nozzles as in claim 1, wherein connection of two connecting sides in a rotatable and sealed manner is accomplished by disposing a recess at a planar surface of each of the two connecting sides and a circular positioning ring in between the two connecting sides, and engaging the recesses and the circular positioning ring respectively to sealingly connect the two connecting sides with each other.

4. The position adjusting means for hot runner nozzles as in claim 1, wherein connection of two connecting sides in a rotatable and sealed manner is accomplished by disposing a recess at one of the connecting sides and receiving the other connecting side in the recess.

5. The position adjusting means for hot runner nozzles as in claim 1, wherein connection of two connecting sides in a rotatable and sealed manner is that any degree of rotation along an entire circumference is allowed, or a limited decree of rotation between the two connecting sides is allowed by limitation of a limiting means.

6. The position adjusting means for hot runner nozzles as in claim 1, wherein the rotating transitional member or the nozzle has a cross section in shape of circle, ellipse, square, triangle or polygon.

7. A The position adjusting means for hot runner nozzles as in any of the claims 1 or 2-6, wherein the two connecting sides which are connected to each other in a rotatable and sealed manner are disposed in parallel to the mold plate of an injection molding machine or at a particular degree in relation to the mold plate.

8. The position adjusting means for hot runner nozzles as in any of the claims 1 or 2-6, wherein runners between respective inlets and outlets of the rotating transitional member and the nozzle are in either one of the following five forms: 1) form of oblique runners which directly connect with respective inlets and outlets, 2) form of step-shaped runners formed by vertical portions of the runners and horizontal portions of the runners joining together; 3) form of arc-shaped runners; 4) form of wave-shaped runners; 5) form of vortex-shaped runners.

9. The position adjusting means for hot runner nozzles as in any of the claims 1 or 2-6, wherein there may be one or more than one runners connecting respective inlets and outlets inside the rotating transitional member and the nozzle.

10. The position adjusting means for hot runner nozzles as in any of the claims 1 or 2-6, wherein the distance between the symmetry axes of the inlet and the outlet of the rotating transitional member is larger, the same or smaller than the distance between the symmetry axes of the inlet and the outlet of the nozzle or the nozzle assembly formed by the nozzle and the nozzle extension member combining together.

11. An adjusting method to adjust positions of hot runner nozzles utilizing the position adjusting means for hot runner nozzles as in claim 1, comprising the following steps: with the symmetry axis of the inlet of the nozzle or the rotating transitional member as circle center, rotate either one of the rotating transitional member or the nozzle or rotate both the rotating transitional member and the nozzle to position the outlet of the nozzle at a desired position within a particular area.

12. The adjusting method to adjust positions of hot runner nozzles as in claim 11, wherein if there are more than one rotating transitional members, rotate either one of the nozzle or one or more of the rotating transitional members, or rotate both the nozzle and one or more of the rotating transitional members to position the outlet of the nozzle at a desired position within a particular area.

13. A hot runner system of plastics injection molding or a runner system for channeling processing materials which contains one or more nozzles and utilizes the position adjusting means for hot runner nozzles as in claim 1.

* * * * *